(12) United States Patent
Zhou

(10) Patent No.: US 12,721,335 B2
(45) Date of Patent: Sep. 1, 2026

(54) OUTDOOR HUNTING RECORDER

(71) Applicant: Shenzhen Kaisennick Intelligent Technology Co., Ltd., Shenzhen (CN)

(72) Inventor: Yongkai Zhou, Shenzhen (CN)

(73) Assignee: Shenzhen Kaisennick intelligent Technology Co., Ltd., Shenzhen (CN)

(*) Notice: Subject to any disclaimer, the term of this patent is extended or adjusted under 35 U.S.C. 154(b) by 188 days.

(21) Appl. No.: 18/783,613

(22) Filed: Jul. 25, 2024

(65) Prior Publication Data

US 2026/0026494 A1 Jan. 29, 2026

(51) Int. Cl.

*A01M 31/00* (2006.01)
*H04N 23/51* (2023.01)
*H04N 23/695* (2023.01)

(52) U.S. Cl.

CPC .......... *A01M 31/002* (2013.01); *H04N 23/51* (2023.01); *H04N 23/695* (2023.01)

(58) Field of Classification Search

CPC ... A01M 31/002; H04N 23/51; H04N 23/695; H04N 23/50; H04N 5/76; H04N 23/62
See application file for complete search history.

(56) References Cited

U.S. PATENT DOCUMENTS

| | | | | |
|---|---|---|---|---|
| 12,457,402 | B1 * | 10/2025 | Piersiak | H04N 23/51 |
| 2020/0177715 | A1 * | 6/2020 | Chen | H04M 1/0264 |
| 2020/0296191 | A1 * | 9/2020 | Zeng | H04M 1/0264 |

* cited by examiner

*Primary Examiner* — Christopher K Peterson
(74) *Attorney, Agent, or Firm* — JEEN IP LAW, LLC

(57) ABSTRACT

The present disclosure provides an outdoor hunting recorder, related to the field of recorders, including: a reset assembly, which includes a joint-control mechanism and a button mechanism. The reset assembly has two use modes, namely an automatic reset mode and a manual reset mode. In the automatic reset mode, when a camera base is turned on, a control device in the control base can automatically reset camera parameters for subsequent re-adjustment and use of various data parameters. In the manual reset mode, when the camera base is turned on, the control device in the control base still retains current set parameters, which facilitates adjustment and use of a single camera parameter. This solves a cumbersome problem that existing outdoor hunting recorders do not have a reset button, and when all parameters need to be reset, each parameter needs to be adjusted and reset one by one.

8 Claims, 7 Drawing Sheets

OUTDOOR HUNTING RECORDER

TECHNICAL FIELD

The present disclosure relates to the field of recorder technologies, and in particular, to an outdoor hunting recorder.

BACKGROUND

A recorder is a device that captures information related to images, sounds, and other aspects of people's daily lives. It has been widely used in various fields. During outdoor hunting, an outdoor recorder is worn to record various observations and experiences.

However, for the current outdoor hunting recorders, they are mostly flip-type structures. After being turned on, they will enter a debugging mode to adjust various parameters of the recorder. However, the existing recorders do not have a reset button. When all parameters need to be reset, each parameter needs to be adjusted and reset one by one, which is cumbersome, inconvenient to use, and not practical.

SUMMARY

The embodiments of the present disclosure relate to an outdoor hunting recorder, which has a reset assembly and two use modes, that is, an automatic reset mode and a manual reset mode. In the automatic reset mode, a control device in a control base can automatically reset camera parameters when the camera base is turned on, so that various data parameters can be adjusted and used again in the future. In the manual reset mode, the control device in the control base will still retain current set parameters when the camera base is turned on, which renders it convenient to adjust and use a single camera parameter. In the automatic reset mode, a recorder assembly can also be manually reset through a button mechanism, which is convenient to use and can be adjusted according to an actual use need. It has strong flexibility, adaptability, and practicality.

A first aspect of the present disclosure provides an outdoor hunting recorder, including a recorder assembly, which includes a control base, a camera base, and a battery compartment; where the camera base is rotatably connected to a top of the control base, and the battery compartment is fixedly connected to a bottom of the control base in a detachable manner; where the outdoor hunting recorder further includes a reset assembly, which includes a joint-control mechanism and a button mechanism;

- the joint-control mechanism includes a drive base, a lifting base, and a control rod; the drive base is connected to a top of the control base in an insertion manner; the drive base is connected to an outside of an rotation axis of the camera base in an insertion manner; the lifting base is connected to an interior of the control base in an insertion manner; and the control rod is connected to an interior of the lifting base in an insertion manner;
- the button mechanism includes a trigger base, an operation column, and a reset button; the trigger base is connected to an interior of the control base in an insertion manner; the operation column is connected to the interior of the control base in an insertion manner; and the operation column is connected to an interior of the trigger base in an insertion manner; an outer end of the operation column is exposed out of the interior of the control base; the reset button is fixedly installed in the control base; the trigger base, operation column, and reset button are in the same straight line;
- the interior of the control base is provided with a control device configured to control photographing and recording parameters, and the reset button is electrically connected to the control device; the reset button is triggered after being pressed and released to enable the control device to reset overall photographing and recording parameters of the recorder assembly.

In at least some embodiments, an outside of the rotation axis of the camera base is provided with a drive groove in a shape of spiral, and an interior of the drive base is provided with a drive protrusion, which is connected to an interior of the drive groove in an insertion manner.

In at least some embodiments, a bottom of the drive base is provided with a tilted lifting groove, one side of the lifting base is provided with a lifting rod, and the lifting rod is connected to an interior of the lifting groove in an insertion manner.

In at least some embodiments, an outer part of a rod body of the control rod is provided with a thread, and the control rod is screwed to the interior of the lifting base through the thread of the rod body.

In at least some embodiments, the top of the control base, the rotation axis of the camera base, the interior of the drive base and an interior the lifting base are all provided with an avoidance through-hole; when the camera base is in a closed state, the avoidance through-holes of the control base, the camera base, the drive base, and the lifting base are in a same vertical direction with the control rod.

In at least some embodiments, a first spring is provided on one side of the trigger base, and two ends of the first spring respectively abut against the interior of the trigger base and the interior of the control base.

In at least some embodiments, an interior of the operation column is provided with a second spring, and two ends of the second spring respectively abut against the interior of the operation column and the interior of the trigger base; an elastic force of the second spring is greater than that of the first spring.

In at least some embodiments, the trigger base contacts and presses the reset button when moving towards a direction close to the reset button.

In at least some embodiments, a locking hole is provided in the trigger base, and when the operation column is not subjected by an external force, the locking hole is located directly below the control rod.

The outdoor hunting recorder provided by the present disclosure has the following beneficial effects.

The reset assembly has two use modes, that is, an automatic reset mode and a manual reset mode. In the automatic reset mode, the control device in the control base can automatically reset camera parameters when the camera base is turned on, so that various data parameters can be adjusted and used again in the future. In the manual reset mode, the control device in the control base will still retain current set parameters when the camera base is turned on, rendering it convenient to adjust and use a single camera parameter. In the automatic reset mode, the recorder assembly can also be manually reset through the button mechanism, which is convenient to use and can be adjusted according to an actual use need, thereby improving flexibility, adaptability, and practicality of the device.

BRIEF DESCRIPTION OF DRAWINGS

In order to provide a clearer explanation of the technical solution of the embodiments of the present disclosure, the accompanying drawings of the embodiments will be briefly introduced below.

The accompanying drawings in the following description only relate to some embodiments of the present disclosure, rather than limiting the present disclosure.

Numeral reference: 1—recorder assembly; 101—control base; 1011—avoidance through-hole; 102—camera base; 1021—drive groove; 103—battery compartment; 2—joint-control mechanism; 201—drive base; 2011—drive protrusion; 2012—lifting groove; 202—lifting base; 2021—lifting rod; 203—control rod; 3—button mechanism; 301—trigger base; 3011—first spring; 3012—locking hole; 302—operation column; 3021—second spring; 303—reset button.

DESCRIPTION OF EMBODIMENTS

In order to clarify the purpose, technical solution, and advantages of the embodiments of the present disclosure, the following will provide a clear and complete description of the technical solution of the embodiments of the present disclosure in combination with the accompanying drawings. Obviously, the described embodiments are a part of the embodiments of the present disclosure, rather than the entire embodiments. Based on the described embodiments of the present disclosure, all other embodiments obtained by those skilled in the art without a need for creative work fall within the protection scope of the present disclosure.

Figure 1:
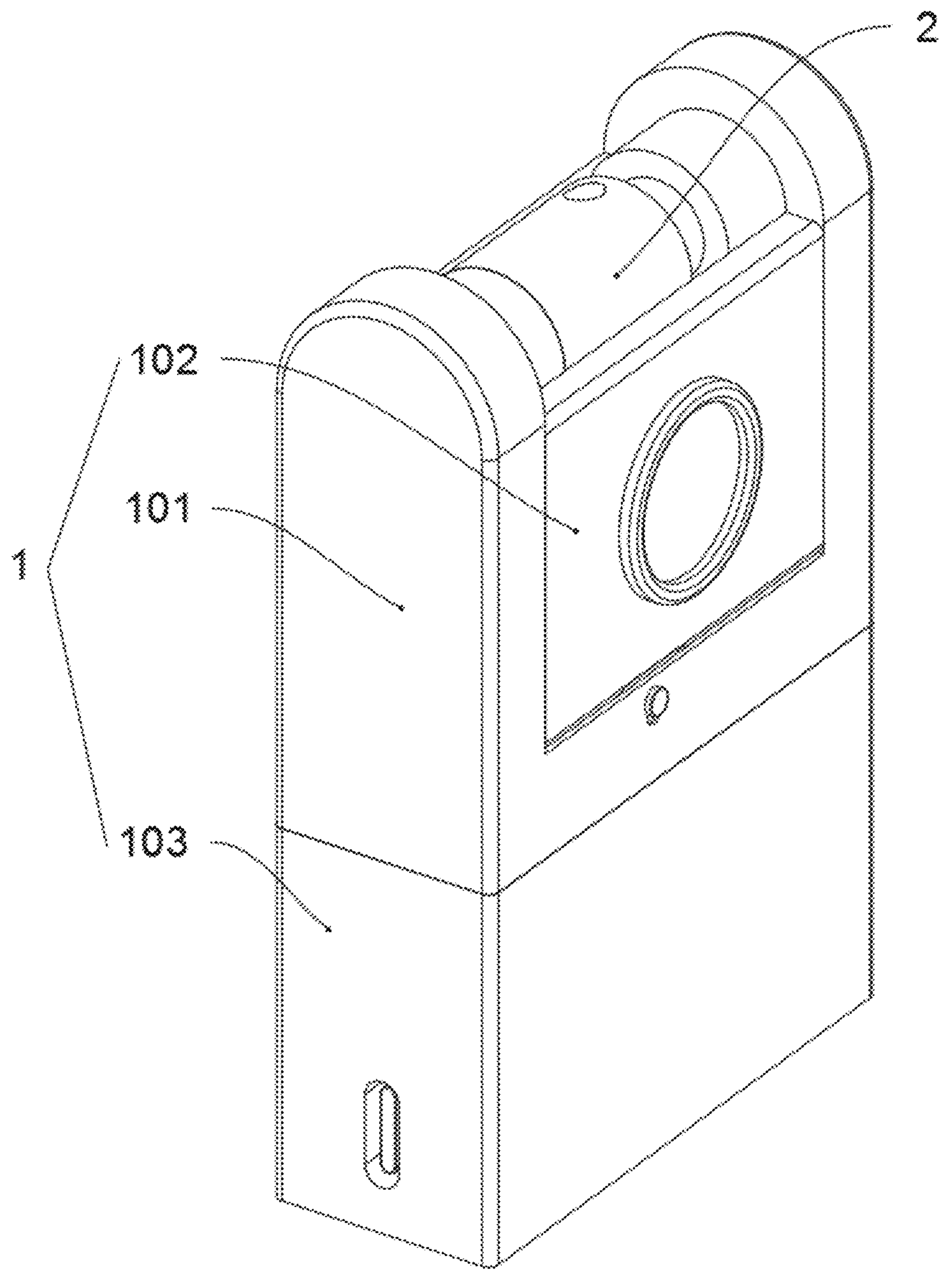
FIG. 1 is a schematic diagram of an overall structure of the present disclosure.
Figure 2:
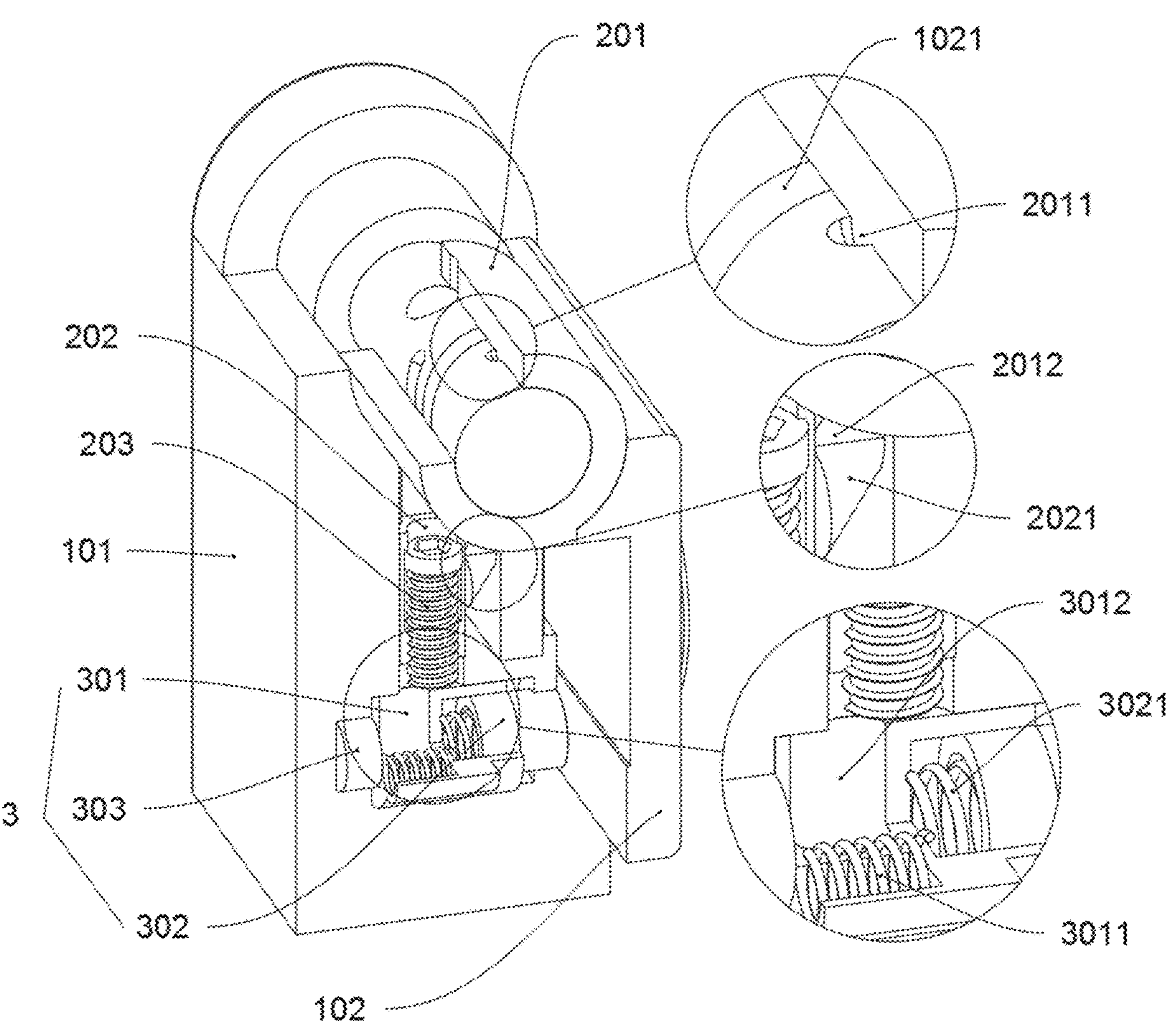
FIG. 2 is a schematic diagram of an internal structure of a camera base in a closed state and in an automatic reset mode of the present disclosure.
Figure 3:
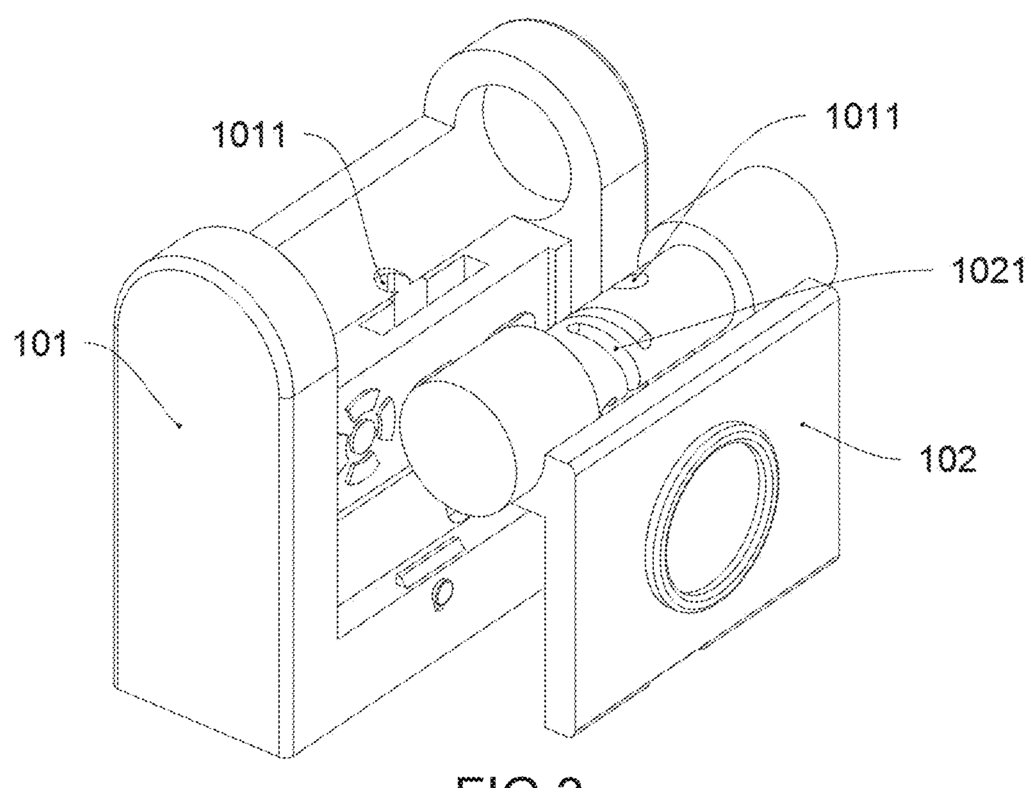
FIG. 3 is a schematic structural diagram of a control base and the camera base after being disassembled of the present disclosure.
Figure 4:
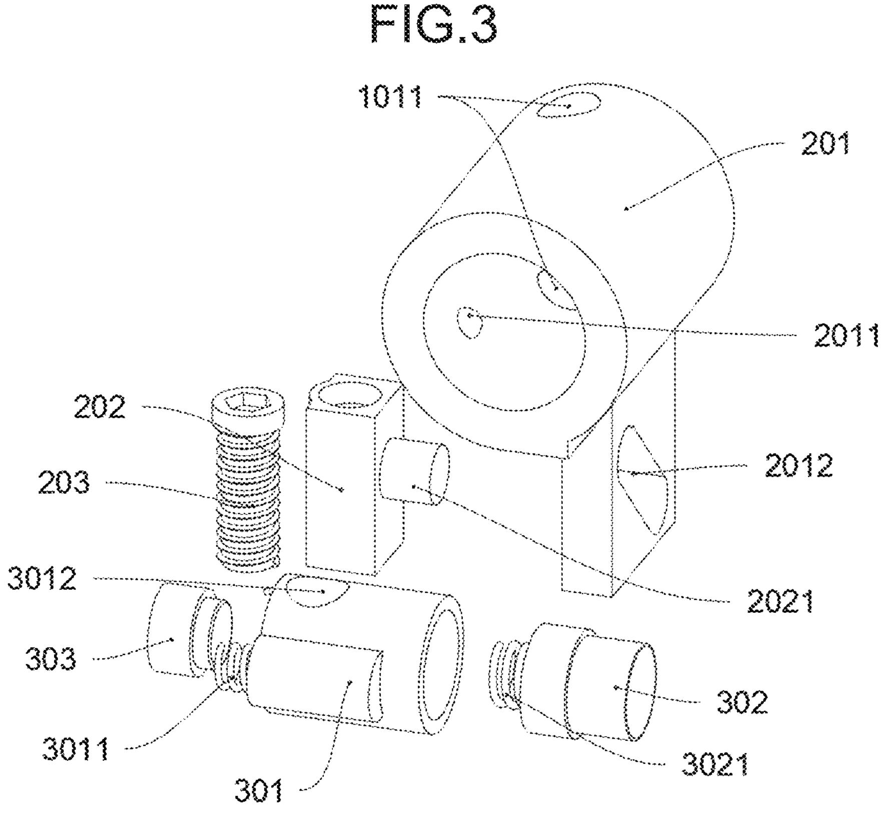
FIG. 4 is a schematic structural diagram of a reset assembly after being disassembled of the present disclosure.
Figure 5:
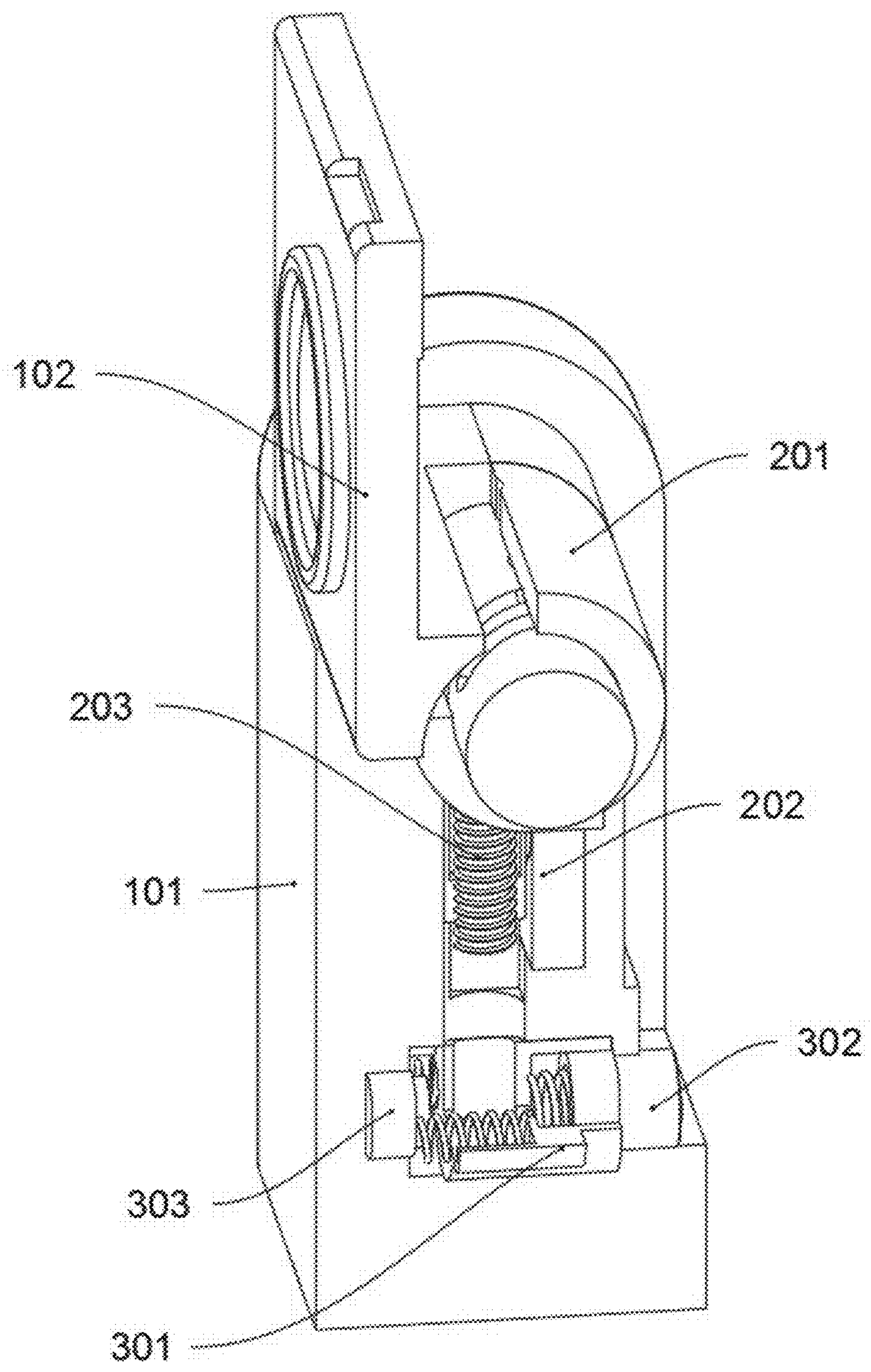
FIG. 5 is a schematic diagram of an internal structure of the camera base in FIG. 2 after being turned on of the present disclosure.
Figure 6:
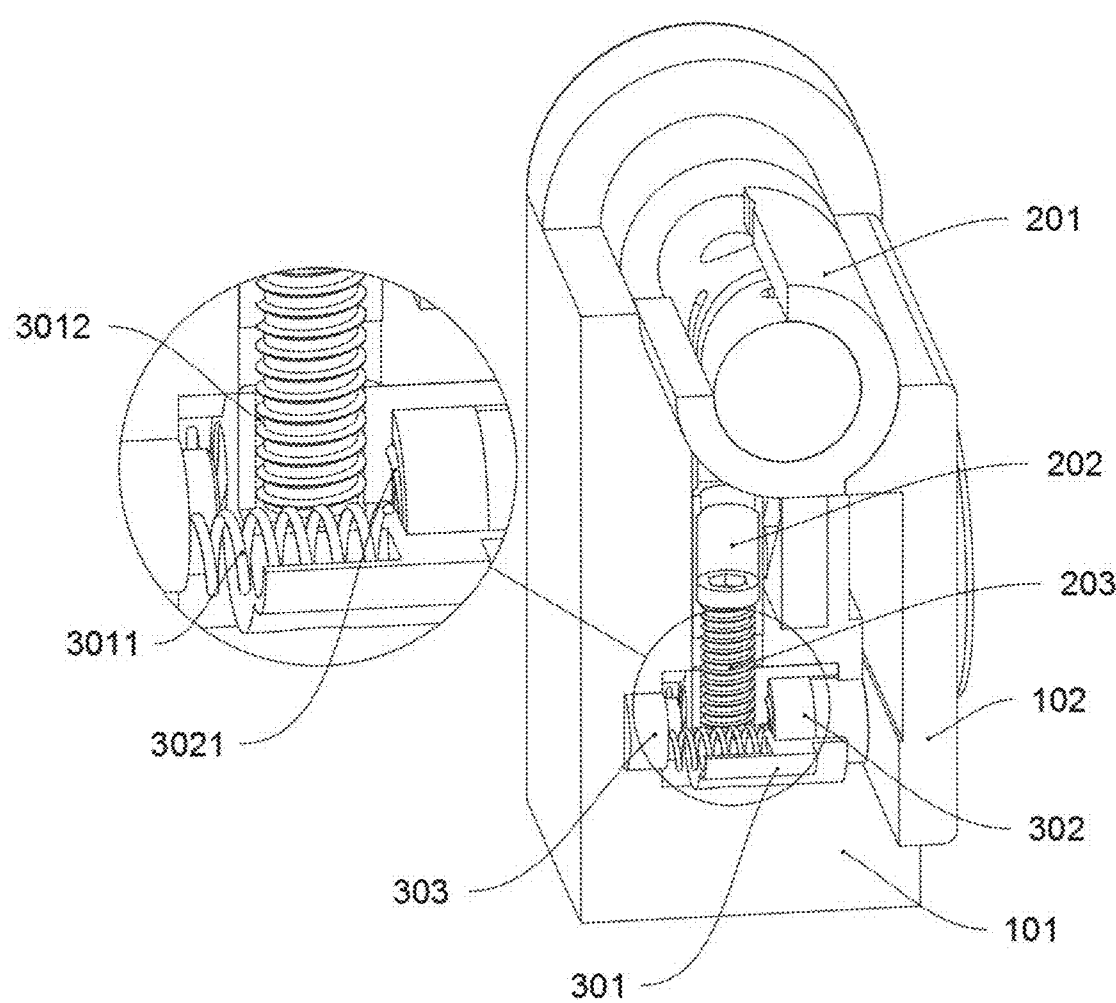
FIG. 6 is a schematic diagram of an internal structure of the camera base in a closed state and in a manual reset mode of the present disclosure.
Figure 7:
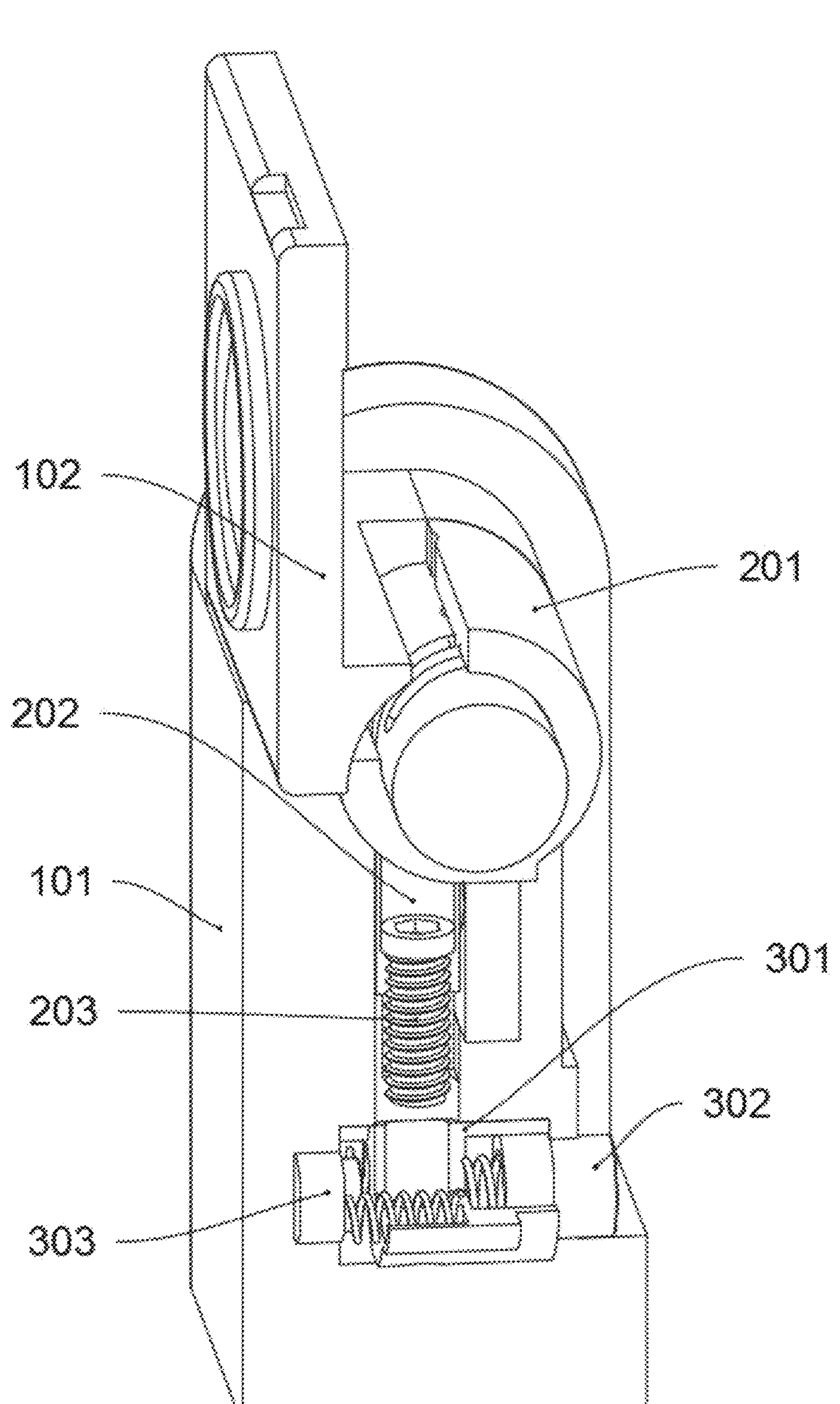
FIG. 7 is a schematic diagram of an internal structure of the camera base in FIG. 6 after being turned on of the present disclosure.
Figure 8:
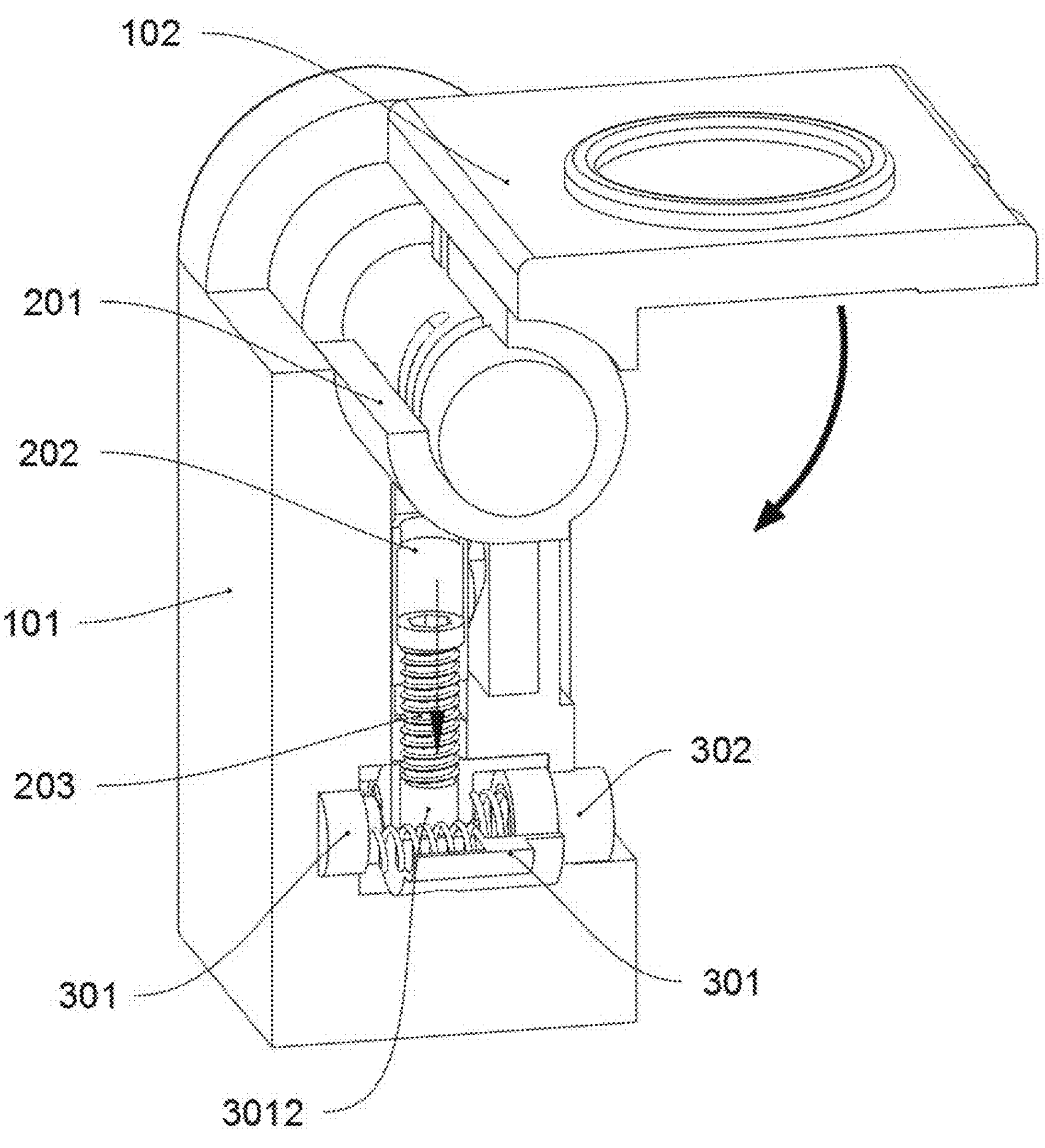
FIG. 8 is a schematic diagram of an internal structure of the camera base in FIG. 7 when performing a closing action of the present disclosure.

Please refer to FIGS. 1 to 8:

Embodiment 1: the present disclosure provides an outdoor hunting recorder, which includes a recorder assembly 1. The recorder assembly 1 includes a control base 101, a camera base 102, and a battery compartment 103. The camera base 102 is rotatably connected to a top of the control base 101, and the battery compartment 103 is fixedly connected to a bottom of the control base 101 in a detachable manner; the outdoor hunting recorder further includes a reset assembly, which includes a joint-control mechanism 2 and a button mechanism 3.

The joint-control mechanism 2 includes a drive base 201, a lifting base 202, and a control rod 203. The drive base 201 is connected to a top of the control base 101 in an insertion manner, and the drive base 201 is connected to an outside of a rotation axis of the camera base 102 in an insertion manner. The lifting base 202 is connected to an interior of the control base 101 in an insertion manner, and the control rod 203 is connected to an interior of the lifting base 202 in an insertion manner.

The button mechanism 3 includes a trigger base 301, an operation column 302, and a reset button 303. The trigger base 301 is connected to an interior of the control base 101 in an insertion manner, the operation column 302 is connected to an interior of the control base 101 in an insertion manner, and the operation column 302 is connected to an interior of the trigger base 301 in an insertion manner. An outer end of the operation column 302 is exposed out of the interior of the control base 101, and the reset button 303 is fixedly installed in the control base 101. The trigger base 301, the operation column 302, and the reset button 303 are in the same straight line.

A control device is provided in the control base 101 that is configured to control photographing and recording parameters, and the reset button 303 is electrically connected to the control device. The reset button 303 will only be triggered after being pressed and released to enable the control device to reset overall photographing and recording parameters of the recorder assembly 1.

In the embodiment of the present disclosure, an outside of the rotation axis of the camber base 102 is provided with a drive groove 1021 in a shape of spiral, and an interior of the drive base 201 is provided with a drive protrusion 2011, which is connected to an interior of the drive groove 1021 in an insertion manner. In use, the joint-control mechanism 2 can control a triggering manner of the button mechanism 3, thereby achieving a switching between an automatic reset mode and a manual reset mode of the reset assembly. When the camera base 102 is performing an opening (opening a cover) action, the drive groove 1021 can drive the drive base 201 to move through the drive protrusion 2011. A bottom of the drive base 201 is provided with a tilted lifting groove 2012, one side of the lifting base 202 is provided with a lifting rod 2021, which is connected to an interior of the lifting rod 2021 in an insertion manner. The lifting groove 2012 can drive the lifting base 202 and the control rod 203 to move upward when the drive base 201 is moved; on the contrary, when the camera base 102 is performing a closing (shutting) action, the lifting base 202 and the control rod 203 will move downwards. Therefore, by adjusting a lowest use position of the control rod 203 when moving downwards, the switching between the automatic reset mode and the manual reset mode of the reset assembly can be achieved, which is convenient to adjust and flexible to use.

In the embodiment of the present disclosure, an outer part of a rod body of the control rod 203 is provided with a thread, and the control rod 203 is screwed to the interior of the lifting base 202 through the thread of the rod body. In use, the lowest use position of the control rod 203 when moved down can be adjusted by changing its installation position in the lifting base 202. The top of the control base 101, the rotation axis of the camera base 102, the interior of the drive base 201, and an interior of the lifting base 202 are all provided with an avoidance through-hole 1011. When the camera base 102 is in a closed state, the avoidance through-holes 1011 of the control base 101, the camera base 102, the drive base 201, and the lifting base 202 are in a same vertical direction with the control rod 203. As the setting of the avoidance through-holes 1011, the control rod 203 can be directly rotated by a tool, (such as, a screwdriver, a hex wrench, etc.,) that passes through the avoidance through-holes 1011. When the control rod 203 is rotated, it can move up and down within the lifting base 202 through the thread of the rod body, thereby changing the use position, that is, changing the lowest use position of the control rod 203 when moving down.

In the embodiment of the present disclosure, a first spring 3011 is provided on one side of the trigger base 301, and two ends of the first spring 3011 respectively abut against the interior of the trigger base 301 and the interior of the control base 101. An interior of the operation column 302 is provided with a second spring 3021, and two ends of the second spring 3021 respectively abut against the interior of the operation column 302 and the interior of the trigger base 301. An elastic force of the second spring 3021 is greater than that of the first spring 3011. In use, when the reset assembly is in the automatic reset mode, the lowest use position of the control rod 203 when it moved down is higher than a use position of a locking hole 3012. Therefore, when the camera base 102 is closed, the base of the camera base 102 squeezes the operation column 302 to move towards the interior of control base 101, as the elastic force of the second spring 3021 is greater than that of the first spring 3011, after the operation column 302 is pressed, the trigger base 301 can be driven by the operation column 302 to synchronously move, contact and press the reset button 303 and compress the first spring 3011. When the camera base 102 is closed, the operation column 302 is continued to be squeeze, which renders the reset button is unable to reset, and thus the reset button 303 will always be pressed. As the reset button 303 is only triggered after being pressed and released to enable the control device to reset the overall photographing and recording parameters of the recorder assembly 1. Therefore, the trigger base 301 will maintain current set parameters for recording and photographing when contacting and pressing effect on the reset button 303 by the trigger base 301 have not been released. Afterwards, when the camera base 102 is turned on, a squeezing effect of the camera base 102 to the operation column 302 disappeared, and under an action of the first spring 3011, the button mechanism 3 will automatically reset and release contacting and pressing state of the reset button 303, as a result, the recorder assembly 1 will automatically reset all parameters for re-adjustment and use, and thereafter, a reset function of the recorder assembly 1 can still be achieved by manually pressing the operation column 302, which is flexible and convenient to use.

In the embodiment of the present disclosure, when the trigger base 301 moves in a direction close to the reset button 303, it will contact and press the reset button 303. The locking hole 3012 is provided in the trigger base 301, and when the operation column 302 is not subjected by an external force, the locking hole 3012 is located directly below the control rod 203. In use, when the reset assembly is in the manual reset mode, the lowest use position of the control rod 203 when it is moved down is located in the locking hole 3012. That is, when the camera base 102 is performing a closing action, the control rod 203 will be pressed before the operation column 302, by the camera base 102, and it will enter the interior of the locking hole 3012. When the control rod 203 enters the interior of the locking hole 3012, the trigger base 301 will be locked without changing its use position. Therefore, even if the operation column 302 is pressed by the camera base 102, the operation column 302 only compresses the second spring 3021 and does not drive the trigger base 301 to move, thereby avoiding the reset button 303 from being contacted and pressed. Afterwards, when the camera base 102 performs the opening action, the control rod 203 will completely be detached from the interior of the locking hole 3012 after the operation column 302 is released. In the manual reset mode, opening and closing actions of the camera base 102 cannot change the use position of the trigger base 301, and the reset button 303 will not be contact and pressed to trigger the reset function. In this mode, only after the camera base 102 is turned on, the operation column 302 can be manually pressed to achieve an overall reset of the recorder assembly 1.

The specific use manner and function of the embodiment: in the present disclosure, the use mode of the reset assembly can be adjusted according to an actual use need. The joint-control mechanism 2 can control the triggering manner of the button mechanism 3, thereby achieving the switching between the automatic reset mode and manual reset mode of the reset assembly. When the camera base 102 is performing an opening (opening a cover) action, the drive groove 1021 can drive the drive base 201 to move through the drive protrusion 2011. When the drive base 201 is moving, the lifting groove 2012 can drive the lifting base 202 and the control rod 203 to move upwards through the lifting rod 2021. Conversely, when the camera base 102 is performing a closing (shutting) action, the lifting base 202 and the control rod 203 will move downwards, by adjusting the lowest use position of the control rod 203 when moving downward, the switching between the automatic reset mode and manual reset mode of the reset assembly can be achieved. The lowest use position of the control rod 203 when moving downward can be adjusted by changing its installation position within the lifting base 202. Due to the setting of the avoidance through-holes 1011, the control rod 203 can be directly rotated with a tool (such as a screwdriver, a hex wrenches, etc.) that passes through the avoidance through-holes 1011. When the control rod 203 is rotated, it can move up and down in the lifting base 202 through the thread of the rod body, and thereby changing the use position of the control rod 203 when it moving downward, that is, changing the lowest use position of the control rod 203 when moving downward; and the reset assembly is in the automatic reset mode, the lowest use position of the control rod 203 when it moving down is higher than the use position of the locking hole 3012. Thus, when the camera base 102 is closed at this time, the base of the camera base 102 will squeeze the operation column 302 to move towards the interior of the control base 101. Due to the elastic force of the second spring 3021 being greater than the elastic force of the first spring 3011, the operation column 302 can be pressed to drive the trigger base 301 to move synchronously through the second spring 3021 to contact and press the reset button 303 and compress the first spring 3011, and the camera base 102 is closed, the operation column 302 is continued to sequenced, which causes the reset button 303 is unable to reset, and the reset button 303 is always pressed. Since the reset button 303 is only triggered after being pressed and released to enable the control device to reset the photographing and recording parameters of the recorder assembly 1. When the contacting and pressing effect to the reset button 303 by the trigger base 301 is not released, the recorder assembly 1 will always maintain the current set parameters for recording and photographing use, afterwards, when the camera base 102 is turned on, the squeezing effect of the camera base 102 on the operation column 302 disappears, and under the action of the first spring 3011, the button mechanism 3 will automatically reset and release the contacting and pressing state of the reset button 303. As a result, the recorder assembly 1 will automatically reset all parameters for re-adjustment and use. Afterward, the reset function of the recorder assembly 1 can still be achieved by manually pressing the operation column 302. When the reset assembly is used in the manual reset mode, the lowest use position of the control rod 203 when moving down is located in the locking hole 3012; that is, when the camera base 102 is performing a closing action, the control rod 203 will be pressed before the operation column 302, by the camera base 102, and enter to the interior of the locking hole 3012. Upon the control rod 203 entering the interior of the locking hole 3012, the trigger base 301 is locked without changing its use position. afterward, even if the operation column 302 is pressed by the camera base 102, the operation column 302 will only compress the second spring 3021 and will not drive the trigger base 301 to move, thus avoiding the reset button 303 from being contacted and pressed. When the camera base 102 performs the opening action, the control rod 203 will completely be detached from the interior of the locking hole 3012 after the operation column 302 is released. That is, in the manual reset mode, the opening and closing action of the camera base 102 cannot change the use position of the trigger base 301. Therefore, the reset button 303 will not be contacted and pressed to trigger the reset function. In this mode, only after the camera base 102 is turned on, the operation column 302 can be manually pressed to achieve the overall reset effect of the recorder assembly 1. After the adjustment is completed, the camera seat 102 is closed, the recorder assembly 1 is worn in a suitable position on the body, then it can be started up and used.

In another embodiment, the battery in the battery compartment 103 is charged through a USB power supply, which is convenient to use and eliminates a need for battery replacement. It is flexible to use, and a detachable design of the battery compartment 103 also facilitates maintenance and replacement of the battery compartment 103 and its internal batteries.

In the present disclosure, the following is needed to be noted:

1. The accompanying drawings of the embodiments of the present disclosure only relate to structures related to the embodiments of the present disclosure, and other structures can refer to a conversion design.
2. Without conflict, the embodiments of the present disclosure and the features in the embodiments can be combined with each other to obtain new embodiments.

The above are only specific embodiments of the present disclosure, but the protection scope of the present disclosure is not limited to this. Any changes or replacements can be easily thought of by the technical personnel familiar with the technical field within the scope of the present disclosure should be covered within the protection scope of the present disclosure. Therefore, the protection scope of the present disclosure shall be based on the protection scope of the claims.

What is claimed is:

1. An outdoor hunting recorder, comprising a recorder assembly, which comprises a control base, a camera base, and a battery compartment; wherein the camera base is rotatably connected to a top of the control base, and the battery compartment is fixedly connected to a bottom of the control base in a detachable manner; wherein the outdoor hunting recorder further comprises a reset assembly, which comprises a joint-control mechanism and a button mechanism;

the joint-control mechanism comprises a drive base, a lifting base, and a control rod; the drive base is connected to a top of the control base in an insertion manner; the drive base is connected to an outside of an rotation axis of the camera base in an insertion manner; the lifting base is connected to an interior of the control base in an insertion manner; and the control rod is connected to an interior of the lifting base in an insertion manner;

the button mechanism comprises a trigger base, an operation column, and a reset button; the trigger base is connected to an interior of the control base in an insertion manner; the operation column is connected to the interior of the control base in an insertion manner; and the operation column is connected to an interior of the trigger base in an insertion manner; an outer end of the operation column is exposed out of the interior of the control base; the reset button is fixedly installed in the control base; the trigger base, operation column, and reset button are in the same straight line;

the interior of the control base is provided with a control device configured to control photographing and recording parameters, and the reset button is electrically connected to the control device; the reset button is triggered after being pressed and released to enable the control device to reset overall photographing and recording parameters of the recorder assembly;

the top of the control base, the rotation axis of the camera base, the interior of the drive base and an interior the lifting base are all provided with an avoidance through-hole; when the camera base is in a closed state, the avoidance through-holes of the control base, the camera base, the drive base, and the lifting base are in a same vertical direction with the control rod.

2. The outdoor hunting recorder as claimed in claim 1, wherein an outside of the rotation axis of the camera base is provided with a drive groove in a shape of spiral, and an interior of the drive base is provided with a drive protrusion, which is connected to an interior of the drive groove in an insertion manner.

3. The outdoor hunting recorder as claimed in claim 2, wherein a bottom of the drive base is provided with a tilted lifting groove, one side of the lifting base is provided with a lifting rod, and the lifting rod is connected to an interior of the lifting groove in an insertion manner.

4. The outdoor hunting recorder as claimed in claim 3, wherein an outer part of a rod body of the control rod is provided with a thread, and the control rod is screwed to the interior of the lifting base through the thread of the rod body.

5. The outdoor hunting recorder as claimed in claim 4, wherein a first spring is provided on one side of the trigger base, and two ends of the first spring respectively abut against the interior of the trigger base and the interior of the control base.

6. The outdoor hunting recorder as claimed in claim 5, wherein an interior of the operation column is provided with a second spring, and two ends of the second spring respectively abut against the interior of the operation column and the interior of the trigger base; an elastic force of the second spring is greater than that of the first spring.

7. The outdoor hunting recorder as claimed in claim 6, wherein the trigger base contacts and presses the reset button when moving towards a direction close to the reset button, and the reset button is triggered after being pressed and released.

8. The outdoor hunting recorder as claimed in claim 7, wherein a locking hole is provided in the trigger base, and when the operation column is not subjected by an external force, the locking hole is located directly below the control rod.

* * * * *